Patented Mar. 4, 1930

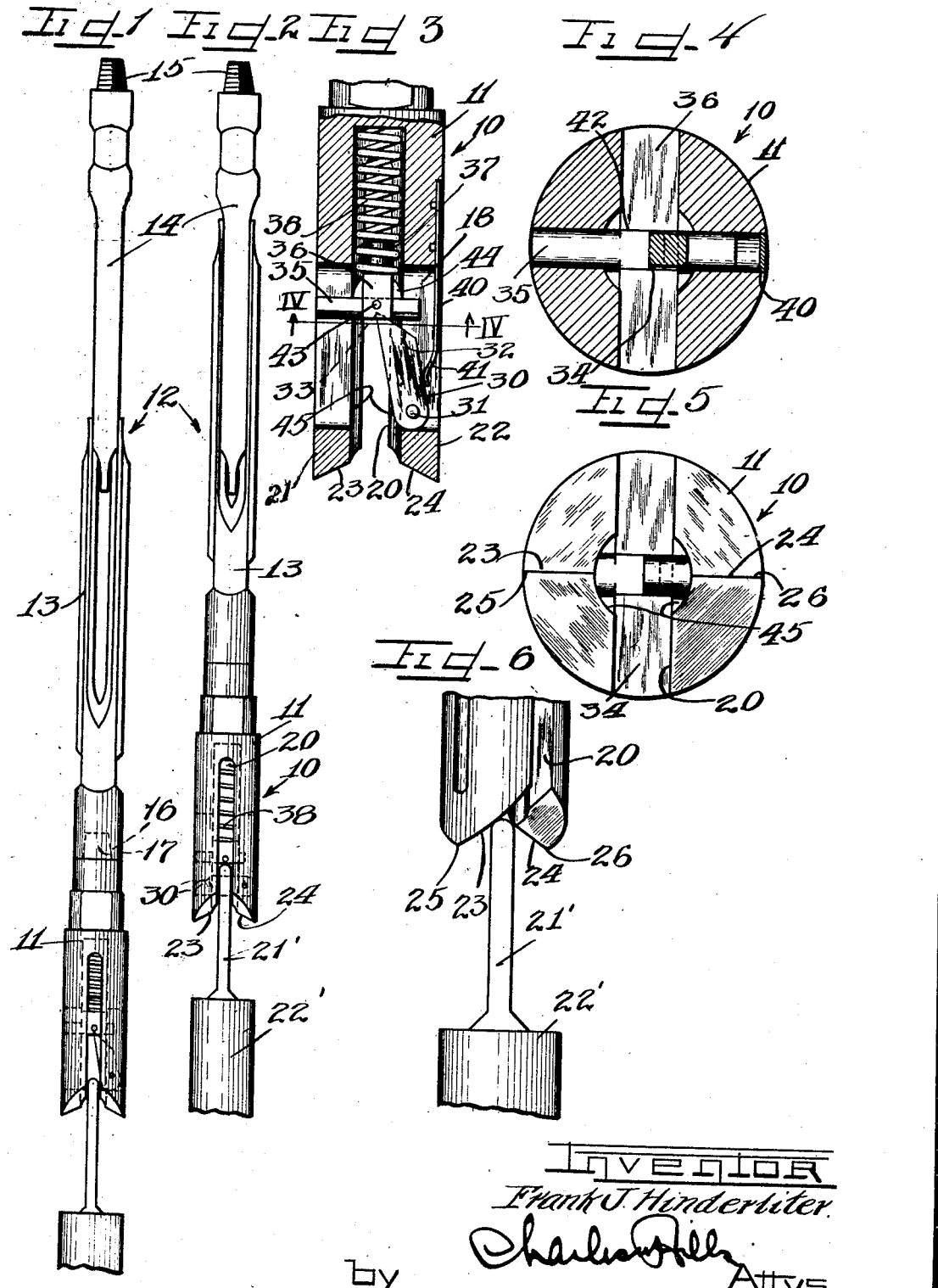

1,749,379

UNITED STATES PATENT OFFICE

FRANK J. HINDERLITER, OF TULSA, OKLAHOMA

TRIP-LATCH JACK

Application filed October 19, 1927. Serial No. 227,199.

The present invention pertains to a device for raising a bailer from the bottom of a well. I have termed this device a trip latch jack.

In the bailing of a well, the bailer quite frequently breaks loose from the supporting and lowering means connected thereto, and it thereafter becomes necessary to fish the bailer from the bottom of the well. I have found that the fishing equipment available at the present time is unfit for this purpose.

An object of the present invention is to provide an improved device for removing a bailer from the bottom of the well.

Another object of my invention resides in the provision of a fishing device which may be termed a trip latch jack adapted to be lowered into the well and latched onto the reins of the bailer.

Other objects and advantages of my invention will more fully appear from the following detailed description taken in connection with the accompanying drawing, which illustrates a single embodiment thereof and in which:

Figure 1 is an elevation of the fishing apparatus of my invention including a jar and a trip latch jack showing the jack in a position ready to engage the reins of the bailer and illustrating the jar in its extended position;

Figure 2 is a view similar to Figure 1 showing the bailer reins latched to the jack of my invention and showing the jar in its normal position;

Figure 3 is a fragmentary vertical sectional view through the trip latch jack drawn to an enlarged scale;

Figure 4 is a cross-sectional view taken on substantially the line IV—IV of Figure 3 looking upwardly;

Figure 5 is an end view of the device shown in Figure 3 taken on substantially the line V—V of Figure 3 looking upwardly, and Figure 6 is a fragmentary view of the end of the trip latch jack illustrating how it is adapted to be properly aligned with the bailer reins.

In the drawings:

Like reference characters designate similar parts throughout the several views.

The reference character 10 designates generally the device of my invention which includes a body 11 adapted to be suspended from a jar 12, as shown in Figures 1 and 2. This jar comprises the usual two parts 13 and 14. In Figure 1 the jar parts are shown in their extended positions, and in Figure 2 the jars are shown in their collapsed position. The upper jar member 14 includes a threaded portion 15 adapted to be coupled to a conduit or other suitable lowering means. The lower jar member 13 includes a threaded opening 16 (Figure 1) adapted to receive a threaded portion 17 formed integral with the body 11 of device 10.

At this time I wish to point out that although I have illustrated my device 10 in connection with the jar 12, the invention is not to be thus limited for obviously the device may be used independently of the jar and in many other capacities.

The body portion 11 of the device 10 has its lower end provided with a transverse elongated slot 18 which intersects and is disposed at right angles to a slot 20 in this member. The slot 20 results in the bifurcation of the lower end of the body 11, as is evident from Figure 3. It is this slot 20 that is adapted to receive the reins 21' of the bailer 22', as will be more fully explained hereinafter. Attention is directed to the fact that the elongated slot 18 does not extend clear through the lower end of the body 11.

The slot 20 divides the lower end of the body 11 into two legs 21 and 22. The lower end of the leg 21 is provided with an angular surface 23, and the lower end of the leg 22 is provided with an angular surface 24 (Figure 5). Each angular surface 23—24 includes a vertex or point 25—26. These angular surfaces and points are adapted to facilitate the alignment of the bailer reins 21' with the slot 20, as will more fully appear with the progress of the present description.

Pivotally mounted in the slot 18 is a latch element 30 which is pivotally mounted upon a pin 31 secured to leg 22 of the body 10. The upper end of this latch element 30 is provided with a slanting edge 32 which terminates in a point 33. This point 33 is adapted to engage in a slot 34 (Figures 3, 4 and 5) in a transverse pin 35. This pin is adapted for vertical movement in the slot 18. Secured to the pin 35 is a rod 36 disposed at right angles to the axis of the pin. This rod is mounted in the slot 20 and is adapted to reciprocate in this slot between the two legs 21 and 22 of the body 10. Secured to the top of the rod 36 is a lug 37 which is surrounded by and secured to one end of a compression spring 38. The other and upper end of this spring 38 is secured to the body portion 11 at the top of the slot 20.

The normal position for the latch element 30 is that in which it is shown in Figure 3. This element, when in this position, is adapted to be urged downwardly about its pivot pin 31 by means of a vertical leaf spring 40 secured at its upper end to the body 11. This spring 40 includes an offset lower end 41 extending into slot 18 and adapted to frictionally engage one side of the latch element 30. Obviously if the latch element is released from the slot 34 through the upward movement of the pin 35, it will be forced to the dotted position shown in Figure 2 due to the action of the leaf spring 41.

It will be noted from Figures 4 and 5 that the rod 36 is provided with a groove 42 through which extends the pin 35. This pin is anchored to the rod 36 by means of a screw 43 (Figure 3). Also it is to be noted that the block or rod 36 has formed integral with it a pair of spherical portions 44 adapted to ride in the arcuate sides 45 (Figures 3 and 5) of the legs 21 and 22 defining the slot 20. This arrangement prevents the rod 36 from swaying sidewardly under the effect of spring 38.

The operation of the device of my invention is briefly as follows:

It will be evident that the first thing to be done is to couple the device 10 to the jar 12. The jar 12 is in turn connected to the lower end of a suitable string of pipe or other lowering means. Thereafter the unit comprising the device 10 and the jar 12 is lowered into the well casing until the lower end of the device comes into contact with the reins 21' of the bailer 22' to be removed from the well. Now should the slot 20 be disposed out of alignment with the reins 21', either of the angular surfaces 23 or 24 on the lower end of the device 10 will result in the upper ends of the reins 21' being guided into the slot 20, as is evident from the illustration in Figure 6. For example, if the reins 21' strike the point 26 on the lower end of the body 11, the upper ends of the reins will come into contact with the angular or slanting surface 24 and will slide upwardly into the slot 20.

As the reins 21' move upwardly in the slot 20, they displace the latch element 30 laterally and strike the pin 35 causing it to move upwardly and thus compressing the spring 38. As soon as the top end of the reins has moved clear of the point on the latch element 30, this element 30 gravitates to the dotted locked position shown in Figure 2, under the effect of the leaf spring 40. Obviously this places the latch element 30 under the top end or loop of the reins 21', thus preventing it from coming out of the slot 20 in the device 10. Also attention is directed to the fact that the compression spring 38 will at all times function to urge the pin 35 into engagement with the top of the reins 21', thus resiliently connecting the reins to the body 11, whereby the bailer may be jarred up and down with the device 10.

The jar 12 may be used to jar the bailer 22' loose should it be submerged in the mire or mud usually present in the bottom of the well. After the bailer 22' has been worked loose from this mud, it may be drawn upwardly through the well casing by means of the string of pipe connected to the jar 12.

Now I desire it understood that although I have illustrated and described in detail the preferred embodiment of my invention, the invention is not to be thus limited, but only in so far as defined by the scope and spirit of the appended claims.

I claim as my invention:

1. In combination, in a device for removing a bailer from a well, a body including an opening adapted to receive the reins of the bailer, a latch extending into said opening, means for holding said latch in said opening and adapted to be tripped by the entry of the reins in said opening, whereby said latch will be released, said latch being arranged so that upon it being tripped it will connect the reins to said body for movement therewith, and resilient means disposed in alignment with said opening adapted to maintain said holding means in contact with the bailer reins upon the tripping of said latch.

2. In combination, in a device for removing a bailer from a well, a body having an opening adapted to receive the reins of the bailer and a slot disposed at substantially right angles to said opening and intersecting said opening, a rod extending through said opening and positioned in said slot adapted to be reciprocated in said slot, resilient means in said body adapted to act upon said rod to at all times urge it downwardly, and a latch element positioned in said slot having a portion extending into said opening adapted to be contacted by the reins upon their entering the opening, said rod being adapted to normally engage said latch element to hold it in a given position and being adapted upon being contacted by the reins of the bailer to allow said latch element to gravitate to a lower position wherein it will prevent the reins from leaving said opening.

3. In combination, in a device for removing a bailer from a well, a body having an opening adapted to receive the reins of the bailer and a slot disposed at substantially right angles to said opening and intersecting said opening, a rod extending through said opening and positioned in said slot adapted to be reciprocated in said slot, resilient means in said body adapted to act upon said rod to at all times urge it downwardly, and a latch element positioned in said slot having a portion extending into said opening adapted to be contacted by the reins upon their entering the opening, said rod being adapted to normally engage said latch element to hold it in a given position and being adapted upon being contacted by the reins of the bailer to allow said latch element to gravitate to a lower position wherein it will prevent the reins from leaving said opening, said lower end of the body being provided with a plurality of slanting guide surfaces adapted to guide the reins into said opening.

4. In combination, in a device for removing a bailer from a well, a body member including an opening adapted to receive the bailer reins and a slot intersecting the opening disposed at substantially right angles thereto, a latch element disposed in said slot, a rod also positioned in said slot and disposed above said latch element, said rod being adapted to normally hold said latch element in a substantially vertical position, and resilient means for urging said rod downwardly into cooperation with the upper end of said latch element, said rod extending through said opening and being adapted to be struck by the reins upon their entering the opening and to thus allow the latch element to be released, whereby it will extend clear across said opening to prevent the reins from leaving the opening, said resilient means functioning to at all times urge said rod downwardly and to thus cause said rod to at all times engage the reins when the same have been latched to the body.

5. In combination in a device for removing a bailer from a well, a body, latch means connected to the body arranged to be tripped by the reins of the bailer whereby the latch means is free to move to a position under the top of the bailer reins, and resilient means for urging the top of the reins into contact with the latch means after said latch means has been tripped and is disposed under the top of the reins whereby the bailer can be reciprocated and jarred with the device.

6. In combination in a device for removing a bailer from a well, a body having a slot to receive the reins of the bailer, latch means positioned in proximity to the slot arranged to be tripped by the reins entering said slot, said latch means upon being tripped moving to a position below the upper or connecting portion of the reins and thereby preventing the reins from leaving said slot, and means positioned in alignment with said slot for urging said upper portion of said reins into engagement with the latch means thereunder.

7. In combination in a device for removing a bailer from a well, a body, latch means arranged to be tripped by the reins of the bailer to connect said reins to said body, said latch means upon tripping being free to move to a position under the upper or connecting portion of the reins whereby the bailer is connected for movement with said device, and means associated with said lower end of said body for aiding in aligning the bailer reins with said latch means.

8. In combination in a device for removing a bailer from a well, a body having a slot to accommodate the reins of the bailer, and latch means associated with said slot arranged to be tripped by the reins of the bailer entering the slot to lock the reins to said body for movement therewith, said lower end of the body being provided with a plurality of chisel-like edges, each of which comprises oppositely slanting guide surfaces for aiding in aligning the bailer reins with said slot.

9. In combination in a device for removing a bailer from a well, a body provided with a bifurcated portion defining a slot to accommodate the reins of the bailer, and latch means associated with said slot arranged to be tripped by the loop portion of the reins of the bailer entering the slot and to lock the reins to said body for movement therewith, said bifurcated portion including a plurality of legs, each of which has its bottom edge formed on a slant to guide the bailer reins into said slot.

10. In combination in a device for removing a bailer from a well, a body including an opening arranged to receive the bailer reins, and means for connecting the loop portion of said reins to said body for movement therewith upon the entry of said reins into said opening, said lower end of the body being provided with a curved guide surface for guiding the reins into said opening.

11. In a fishing tool for removing a part from a well, a body having an opening for receiving a portion of the part in the well, and latch means connected to said body and arranged to be tripped by the portion of the part entering said opening and to be moved to a position below said portion for engaging the underside of said portion upon upward movement of the tool whereby said part is raised with the tool.

12. In a fishing tool for removing a part from a well, a body having an opening for receiving a portion of the part in the well, latch means connected to said body and arranged to be tripped by the portion of the part entering said opening and to be moved to a position below said portion for engaging the underside of said portion upon upward movement of the tool whereby said part is raised with the tool, and means connected to said body for urging said portion into engagement with said latch means when said latch means is under said portion.

In testimony whereof I have hereunto subscribed my name at Tulsa, Oklahoma, county of Tulsa.

FRANK J. HINDERLITER.